Jan. 23, 1962 O. J. MUNZ 3,017,856
SEA FARMING
Original Filed Jan. 31, 1957
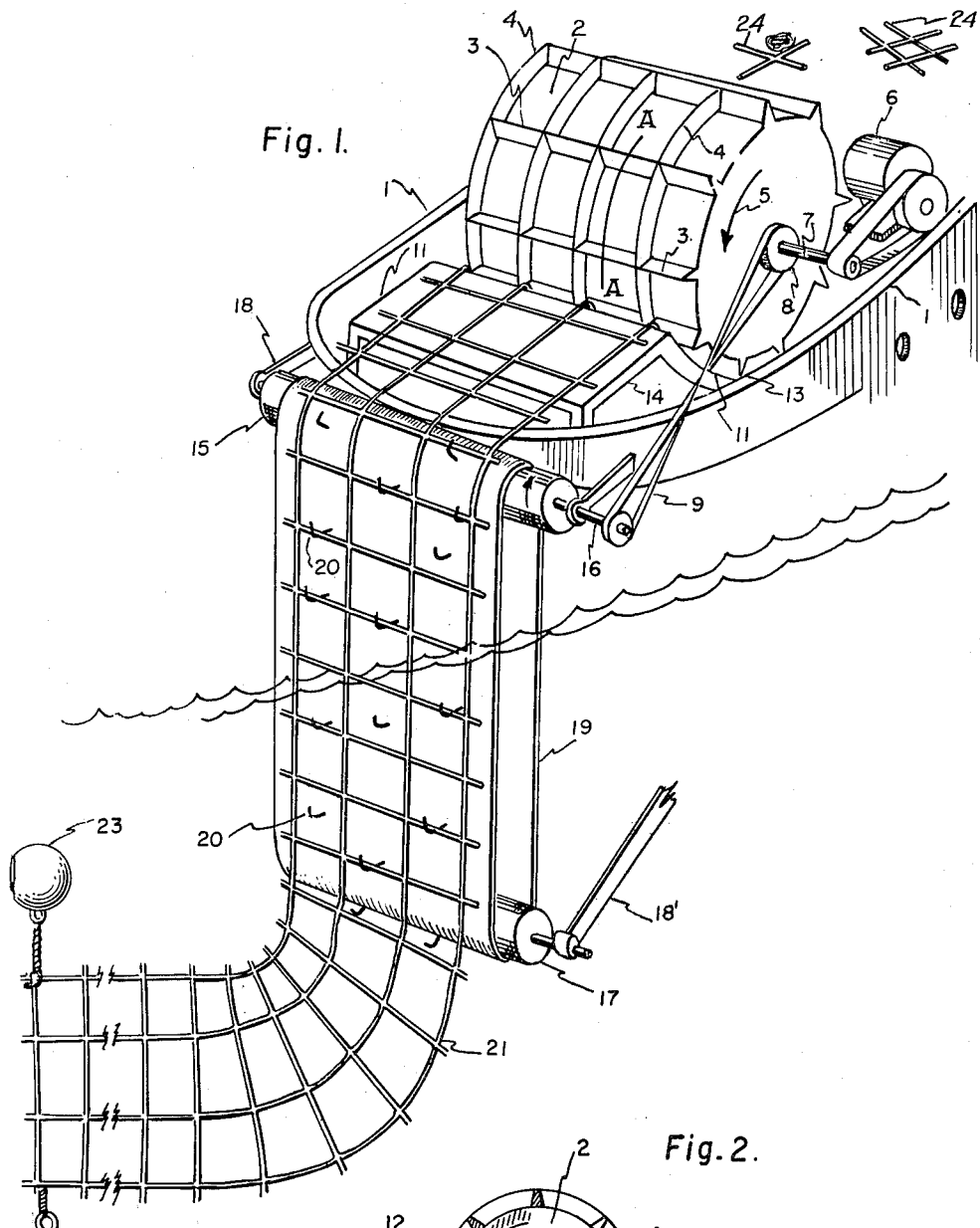
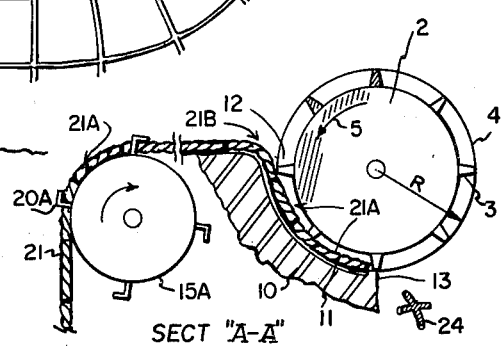
SECT "A-A"
INVENTOR
Otto John Munz.

United States Patent Office 3,017,856
Patented Jan. 23, 1962

3,017,856
SEA FARMING
Otto John Munz, Rte. 3, Harness Creek, Annapolis, Md.
Original application Jan. 31, 1957, Ser. No. 637,545, now Patent No. 2,922,393, dated Jan. 26, 1960. Divided and this application May 28, 1958, Ser. No. 738,410
25 Claims. (Cl. 119—4)

The invention relates to sea farming and more particularly to mass production of seed of mollusks, such as bivalves and in particular oysters, to oyster-seed harvesting, to oyster-seed planting and to harvesting and planting machinery and methods.

This is a division of U.S. patent application Ser. No. 637,545, now Patent No. 2,922,393 filed on January 31, 1957, conforming with the requirement for restriction in that patent application and having the benefit of the earlier filing date of January 31, 1957 of the original application.

Up to the present, only small scale manual methods are employed to grow oyster-seed. Background materials, called cultch, such as ceramic tiles, oyster shells and the like are placed into oyster beds during the oyster spawning season. After oyster-seed attaches itself to the cultch and grows there to a size approximately from 1/4" up, the cultch is laboriously taken out, or "tonged," by haphazard methods.

The young oysters either manually scraped off the cultch, or with the old oyster shell to which they are attached, are thrown overboard into future artificial oyster beds. There some of the seedlings find new solid favorable background material to which they attach themselves and the rest of the seedlings perish. An oyster shell carries up to 25 oyster seeds, but only a few would have enough space there to develop properly.

It is an object of this invention to introduce to oyster farming progressive methods which allow for efficient mass production. Another object of the invention is to provide a novel cultch and novel means of its distribution in the oyster spawning grounds mechanically and to provide simultaneously large cultch areas for seed growing within a limited acreage of spawning grounds.

Another object of the invention is to provide a cultch material which is flexible to allow for its mechanical rolling on and unrolling from a distributing machine and which has solid hard portions after immersion into water to provide a suitable background material for the oyster-seed.

Another object of the invention is to provide a cultch which, after the oyster seed has grown on it, may be mechanically collected and mechanically cut into small parts with only a few oyster-seeds attached on each part for reseeding.

Another object of the invention is to provide a seeding unit comprising oyster-seed attached to artificial cultch for reseeding purposes.

Another object of the invention is to provide a novel cultch comprising oyster growth promoting materials.

Another object of the invention is the method of manufacture of cultch fabric comprising materials favorable for oyster growths and permitting the cultch distribution in a dry flexible state with only portions solid or hardening after immersion.

Another object of the invention is to provide a cultch distributor, an oyster-seed harvester, an oyster-seed separator and an oyster-seed farming drill.

Other objects of the invention will become apparent from the following description and drawings, in which:

FIGURE 1 is a perspective view of the cultch distributor, oyster-seed harvester and cultch separator.

FIGURE 2 is a cross sectional side view of portion of FIGURE 1 along lines A—A including a modification of a detail.

A vessel 1, is equipped with a stamping drum 2, having a multiplicity of spaced removable stamping edges, lateral, 3 and circumferential 4. The drum is rotated in the direction of arrow 5 by a source of power 6. Its shaft 7 is provided with a reversible power take-off comprising sheave 8 and belt 9. The drum is removable and supported in bearings for rotation.

Adjacent to the stamping drum on the deck of the vessel at a controlled distance from the stamping edges of the drum is mounted fixedly and removably a stamping table 10, having a cylindrical concave stamping surface 11, curved adjacent to the stamping edges.

The radius of the drum and the radius of the cylindrical stamping surface of the stamping table are shown to be the same, however the center of the drum is eccentrically oriented relative to the center of the concave surface of the stamping table, so that there is a clearance 12 between the two, decreasing in the direction of arrow 5 to null at point 13. The stamping table has a forwarding platform 14. A conveyor 15, is attached to the outside of the vessel and comprises a drive shaft 16, connected to a source of power, for instance by belt 9. A freely rotating lower cylinder is supported controllably below the drive shaft. An endless belt 19, provided with grappling hooks 20, spaced on it, runs over the two cylinders 15 and 17. The conveyor 15a of FIGURE 2 has the hooks 20a attached thereto rather than to the belt 19 as in FIGURE 1. A spawning net 21 is suspended in the sea, during the oyster spawning season, by anchors 22 and buoys 23 for a time sufficient for the oyster spawn to attach itself to it and to grow there into seed. At the beginning of the seed harvesting operation one end of the net is connected to the grappling hooks of the endless belt, and the net with the oyster-seed is drawn mechanically upwards over the platform 14 into the clearance 12. There the net engages with the edges of the drum, the continuous rotation of the drum increases the gripping engagement of the stamping edges which continue to draw the net in, as it is forwarded by the endless belt. At a point near 13, the gripping force turns into a stamping action, cutting the net radially and transversely into predetermined sections, such as crosses or squares 24. The thickness of the net fabric preferably is at least equal to the clearance between the cutting edges of the drum and the stamping surface at point of engagement 12. The radial height of the cutting edges preferably is at least equal to the combined diameter of the fabric thread and of the average size oyster-seed attached to it. The rotation of the drums and the frictional gripping of its stamping edges draws the net into the clearance 12 to 13. A small percentage of the oyster-seed interfering with the cutting edges is crushed, the oyster-seed on the sections however remains intact. The positions of the drive shaft 16 and of the lower cylinder 17 may be controlled relative to each other in order to adjust the tightness of the endless belt, and relative to the vessel to control the height and position of the endless belt relative to the drum by braces 18 and 18' respectively. The braces have conventional pivoting and telescoping means.

The net is shown with three squares laterally and the stamping edges in the drawing correspond to the three squares, for purposes of demonstration only. An increased number of net squares and of corresponding cutting edges may be employed. The cultch is not limited to a net structure.

The stamping edges may be removably attachable so that when taken off, the drum may serve as storage means for uncoiling a length of fabric overboard into the spawning grounds. The drum stripped of its stamping edges also may be used for disposing overboard of a strip of netting with sections of cultch fastened on it for reseeding, as discussed elsewhere in this disclosure. The stripped drum may be used for uncoiling or coiling of a single line-cultch. The cutting process is accomplished by conventional apparatus and methods with cutters making longitudinal and transverse cuts simultaneously or in close sequence, while the fabric is conveyed to them over rollers, conveyor belts, reciprocating fingers or by other conventional means, or the cutting is done manually.

The cultch of the present invention preferably is a continuous strip of fabric of a length of up to hundreds of feet, limited only by the carrying capacity of the vessel and by the size of the spawning grounds. The width of the cultch ranges from a single strand to nets or other fabrics, several feet wide.

The clutch of the present invention is made from materials metallic and/or textile, permitting folding or rolling. The material must have durability and tensile strength in water which enables it to carry the load of oysters grown on it. In a preferred embodiment of the invention the material is impregnated by organic and inorganic materials hereinafter discussed.

Among the materials suitable for clutch are: organic fibers such as: cotton, jute, sisal, hemp, wood, cellulosic compounds, artificial fibers, synthetic resins, plastics, metal wire, fiber-glass, asbestos and similar, and any combinations thereof capable of producing a flexible fabric. Open mesh netting is preferable, since the oyster-seed distributes itself on it thinly over a wide area and stacking of rows of netting over the oyster grounds during spawning is feasible.

The fabric is impregnated with materials, which stiffen it to provide a solid background attractive to the oyster spat and for the oyster-seed to grow on it. Optionally, conventional additives are included at least in trace amounts into the impregnators to make the fabric elastic, water repellent, to prevent its decay, to repel parasites, to attract the seed and to stimulate the growth of the oysters.

Among the impregnators suitable for such purposes are $CaCO_3$, commercial cements, cementitious materials having as principal compounds di-calcium silicate, tri-calcium aluminate, calcium sulphate, powdered limestone, asbestos, kaolin, polymerizing plastics such as methyl metacrylate, and the like. The additives are mineral and metal salts, such as lead salt, barium sulfate, iodine, phosphorus, copper in at least traceable amounts, at least 5% of the total weight of the mixture of materials having elastomeric properties, anti-rotting and water repellent materials, in conventional amounts.

Three preferred methods by which the impregnator is applied to the fabric are now described:

A. The impregnating and additive materials are mixed preferably with additives having elastomeric properties into a liquid or plastic slurry and the porous fabric immersed therein, drawn through it and dried.

B. The impregnating materials and additives are directly incorporated into a liquid or plastic resinous or polymerizing slurry from which the fabric is extruded. In a preferred embodiment the invention utilizes the properties of commercial hydraulic cements to cure while immersed in water for an extended period of time.

C. The impregnator ground to a fineness for example where approximately 90% passes a 320 mesh sieve, is admixed to the fiber in one or more of the early stages of the spinning. The following procedures are feasible:

(1) The fibers are spun with the impregnator admixed to them. The spinning starts with raw fibers, such as cotton and during the blending process, a percentage of uncured powdered cement is admixed. Thus while the fiber is processed through the spinning equipment in conventional phases, pick and blend, carding, roving, spinning, twisting-plying, cement may be admixed, preferably in the early stages but not later than the roving stage.

Additives may be admixed, such as malt extract, resins, adhesives, etc., to aid in retaining a greater portion of the cement in the fiber and to prevent the cement from dusting out.

The impregnated finished fabric saturated with premixed cement and/or covered with cement are sandwiched in tissue paper or other dissolvable material, or sprayed with resin, adhesive, paint, or similar protecting material.

(2) The fabric is drawn through a calender to apply an adhesive and the cement is dusted on by blowing, spraying, or by repeated calendering.

(3) The cement is cured on the fabric during application by a wet method and the fabric is rolled up with interposed layers of paper to prevent adhesion of adjacent layers.

In each of the above instances, preferably only alternate lateral sections of the fabric are treated with cement, leaving adjacent lateral sections in a flexible non-cemented state, to permit bending and rolling of the solidified textile in a continuous length upon the drum. To produce a continuous strip of such a fabric on the calender a split roll conventional in the textile production is used. The roll is divided into sections with spaces in between, dividers. Adhesive is fed on the roll section and the spaces in between remain untreated. This manner of treating fabric is conventional in the printing industry. Thereafter cement is dusted on the fabric, and it will stick to the lateral portions covered by the adhesive. The spaces in between remain free from cement. The dusted fabric is wetted, for instance, by spraying or immersion and the cement will cure in a conventional manner.

The result is a fabric having parallel portions hardened with cured cement and the like, and spaces in between flexible, because untreated. Thus the fabric is rolled over the drum or unrolled, without breaking the hardened portions, such a fabric having elastomeric properties or with alternate rigid and flexible strips 21A and 21B respectively.

In a referred exemplary embodiment the invention is practised as follows:

A length of impregnated net material 21, provided at one end with anchor and buoy is unrolled or unfolded from the rear of a moving boat into the oyster spawning area. This is done over the endless belt 19, with the cylinder running in reverse. An anchor and a buoy are attached at the other end of the net after it has been stretched in the ocean. The nets are arranged in parallel, closely spaced preferably vertical rows over the spawning grounds. The oyster spat settles on the fabric using it as a clutch and within one to three months develops into seedling size oysters. At such a time the oyster-seeds are harvested by picking up one end of the oyster cultch on the conveyor 19 and directing automatically the cultch through the stamping drum 2 into the seed compartment below the drum. As the net fabric emerges from water, being drawn into the vessel over rollers 15, and into the cutter 2, the alternate strips aligned parallel to the roller and the cutter already are solidified by the long exposure to the water. Thus the net is shown having a succession of stiff and flexible portions 21A and 21B respectively rolling over roller 15 into the cutting edges of drum 2, preferably in a spacing which will cause engagement of the cutting edges of the roller with the flexible, unsolidified portions of the net.

The net with oyster-seed grown over it is cut, for instance, into crosses or squares 24, as shown. Short lengths, angles, U's, hexagons, or other conformations may be used instead.

Another method of growing and separating oyster-seed on a large scale mechanically is to suspend a single line of clutch material 21 over the seed spawning grounds and of drawing it into the vessel through a die, the orifice of which is of the same diameter as the line.

The oyster-seed attached to the line will be stripped off and fall into the seed compartment, and may be re-seeded.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims.

I claim:

1. As a mollusk propagation article for submersion in an oyster growing area, a net comprising a plurality of longitudinal and crosswise strands of flexible material and a plurality of spot attractive cultch portions at spaced intervals on said material.

2. A mollusk propagation article as claim 1, wherein said material retains flexibility intermediate said cultch portions so as to be capable of being formed into rolls.

3. A mollusk propagation article as in claim 1, said cultch portions formed on the interconnections of said longitudinal and crosswise strands.

4. A mollusk propagation article as in claim 1 said longitudinal and crosswise strands being warp members and woof members respectively, secured together at their intersections, said cultch portions being on said intersections.

5. A mollusk propagation article as in claim 1, said longitudinal strands spaced in parallel, said crosswise strands spaced in parallel and angularly interconnected to said longitudinal strands, said cultch secured to said strands at spaced points, said strands flexible between said points, so that they may be handled into and from rolls by machinery.

6. A mollusk propagation article as in claim 1, said cultch portions comprising additives solidifiable on exposure to water.

7. A mollusk propagation article as in claim 1, said cultch portions being coated with a water-soluble substance.

8. A mollusk propagation article as in claim 1, said cultch portions including $CaCO_3$.

9. A mollusk propagation article as in claim 1, said cultch portions including metal salt compounds.

10. A mollusk propagation article as in claim 1, said strands having water repelling properties.

11. A mollusk propagation article as in claim 1, said strands having parasite repelling properties.

12. A mollusk propagation article as in claim 1, said cultch portions comprising at least traces of mineral salts, metals and iodine.

13. A mollusk propagation article as in claim 1, said strands including a metallic wire.

14. A mollusk propagation article as in claim 1, said strands including textile fibers of organic origin.

15. A mollusk propagation article as in claim 1, said strands including artificial fibers.

16. A mollusk propagation article as in claim 1, said strands including synthetic resins.

17. A mollusk propagation article as in claim 1, said strands including fiberglass.

18. A mollusk propagation article as in claim 1, said cultch portions including synthetic resins.

19. A mollusk propagation article as in claim 1, said cultch sections including a rubber compound.

20. A mollusk propagation article as in claim 1, said cultch portions including a composition of $CaCO_3$ with a polymerized plastic.

21. A mollusk propagation article as in claim 1, said cultch portions having spat attached thereto, whereby said net may be positioned into an oyster fattening area.

22. A mollusk propagation article as in claim 1, said cultch portions being porous and stiff.

23. A mollusk propagation article as in claim 1, said cultch portions including a solidified plastic coated with $CaCO_3$.

24. A mollusk propagation article as in claim 1, said cultch portions coated with $CaCO_3$ including mineral and metal additives.

25. A mollusk propagation article as in claim 1, said cultch portions being integral with said strands.

References Cited in the file of this patent

UNITED STATES PATENTS

| | | |
|---|---|---|
| 385,161 | Beach | June 26, 1888 |
| 456,390 | Willis | July 21, 1891 |
| 1,815,521 | Miyagi | July 21, 1931 |